(12) United States Patent
Takahashi et al.

(10) Patent No.: US 11,354,309 B2
(45) Date of Patent: Jun. 7, 2022

(54) INFORMATION PROCESSING APPARATUS AND INFORMATION PROCESSING METHOD

(71) Applicant: SONY CORPORATION, Tokyo (JP)

(72) Inventors: Koki Takahashi, Kanagawa (JP); Masaaki Isozu, Tokyo (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/644,307

(22) PCT Filed: Jul. 18, 2018

(86) PCT No.: PCT/JP2018/026913
§ 371 (c)(1),
(2) Date: Mar. 4, 2020

(87) PCT Pub. No.: WO2019/054042
PCT Pub. Date: Mar. 21, 2019

(65) Prior Publication Data
US 2021/0073227 A1    Mar. 11, 2021

(30) Foreign Application Priority Data
Sep. 14, 2017  (JP) .............................. JP2017-177084

(51) Int. Cl.
*G06F 7/00*      (2006.01)
*G06F 16/2453*   (2019.01)
(Continued)

(52) U.S. Cl.
CPC ...... *G06F 16/24539* (2019.01); *G06F 16/219* (2019.01); *G06F 16/24552* (2019.01)

(58) Field of Classification Search
CPC ............ G06F 16/24539; G06F 16/219; G06F 16/24552; G06F 16/1834; G06F 21/64;
(Continued)

(56) References Cited

U.S. PATENT DOCUMENTS 6,640,240 B1 * 10/2003 Hoffman ............... G06F 16/957
                                                          709/203
7,529,785 B1 *  5/2009 Spertus ............... G06F 11/1453
(Continued)

FOREIGN PATENT DOCUMENTS

JP    2000-163440 A    6/2000
JP    2015-197692 A   11/2015

OTHER PUBLICATIONS

Sakakibara, et al., "An FPGA NIC Based Caching for Blockchain Databases", The Institute of Electronics, Information and Communication Engineers, IEICE Technical Report, vol. 117, No. 153, Jul. 26-28, 2017, pp. 165-170.
(Continued)

*Primary Examiner* — Mohammed R Uddin
(74) *Attorney, Agent, or Firm* — Chip Law Group

(57) ABSTRACT

To be able to deal with more request information without increasing the load on a peer-to-peer database system. An information processing apparatus is provided including an acquisition unit that acquires data provided from a P2P database on the basis of request information, and a storage control unit that controls storage of the data performed by a cache storage unit.

8 Claims, 10 Drawing Sheets

(51) Int. Cl.
*G06F 16/21* (2019.01)
*G06F 16/2455* (2019.01)

(58) Field of Classification Search
CPC .......... G06F 2212/465; G06F 12/0866; G06Q 20/02; G06Q 20/223; G06Q 2220/00; H04L 63/12; H04L 2209/38; H04L 9/3239
See application file for complete search history.

(56) References Cited

U.S. PATENT DOCUMENTS

| | | | | |
|---|---|---|---|---|
| 7,571,167 | B1* | 8/2009 | Campana | G06F 16/9574 |
| 7,818,402 | B1* | 10/2010 | Zhang | H04L 67/108 |
| | | | | 709/219 |
| 8,571,882 | B1* | 10/2013 | Teitelbaum | G06F 12/0866 |
| | | | | 705/2 |
| 9,065,835 | B2* | 6/2015 | Grigsby | G06F 15/173 |
| 9,798,672 | B1* | 10/2017 | Svendsen | G06F 12/0875 |
| 2002/0107934 | A1* | 8/2002 | Lowery | H04L 43/16 |
| | | | | 709/213 |
| 2003/0187935 | A1* | 10/2003 | Agarwalla | H04L 67/2842 |
| | | | | 709/206 |
| 2005/0120082 | A1* | 6/2005 | Hesselink | H04L 63/0272 |
| | | | | 709/203 |
| 2006/0168318 | A1* | 7/2006 | Twiss | H04L 67/1093 |
| | | | | 709/238 |
| 2007/0211651 | A1* | 9/2007 | Ahmed | H04L 63/0442 |
| | | | | 370/256 |
| 2008/0098173 | A1 | 4/2008 | Chidambaran et al. | |
| 2008/0100694 | A1* | 5/2008 | Barkley | H04N 7/152 |
| | | | | 348/14.08 |
| 2009/0225074 | A1* | 9/2009 | Bates | G06T 15/20 |
| | | | | 345/419 |
| 2009/0319519 | A1* | 12/2009 | Sakakihara | G06F 16/1834 |
| 2010/0153415 | A1* | 6/2010 | Muntz | G06F 16/1858 |
| | | | | 707/758 |
| 2011/0072088 | A1* | 3/2011 | Kiyohara | H04L 67/104 |
| | | | | 709/205 |
| 2011/0107078 | A1* | 5/2011 | Resch | H04L 67/1097 |
| | | | | 713/150 |
| 2012/0059864 | A1* | 3/2012 | Bandyopadhyay | |
| | | | | H04L 67/1097 |
| | | | | 707/827 |
| 2012/0198075 | A1* | 8/2012 | Crowe | H04L 67/2885 |
| | | | | 709/226 |
| 2012/0215987 | A1* | 8/2012 | Loewenstein | G06F 12/0822 |
| | | | | 711/143 |
| 2013/0198330 | A1* | 8/2013 | Lee | H04W 4/18 |
| | | | | 709/217 |
| 2013/0244614 | A1* | 9/2013 | Santamaria | H04W 12/069 |
| | | | | 455/411 |
| 2014/0281169 | A1* | 9/2014 | Mehrotra | G06F 12/0866 |
| | | | | 711/103 |
| 2014/0297735 | A1* | 10/2014 | Aoyagi | H04L 67/108 |
| | | | | 709/203 |
| 2015/0095403 | A1* | 4/2015 | Abdukalykov | H04L 51/08 |
| | | | | 709/203 |
| 2015/0269624 | A1* | 9/2015 | Cheng | G06Q 30/0267 |
| | | | | 705/14.58 |
| 2016/0098723 | A1* | 4/2016 | Feeney | G06Q 20/065 |
| | | | | 705/75 |
| 2016/0198016 | A1* | 7/2016 | Tiger | H04L 67/2852 |
| | | | | 709/213 |
| 2016/0203522 | A1* | 7/2016 | Shiffert | G06Q 30/0267 |
| | | | | 705/14.58 |
| 2016/0283920 | A1 | 9/2016 | Fisher et al. | |
| 2016/0292396 | A1* | 10/2016 | Akerwall | G06F 21/10 |
| 2017/0091397 | A1 | 3/2017 | Shah | |
| 2017/0149560 | A1* | 5/2017 | Shah | G06K 9/00228 |
| 2017/0232300 | A1* | 8/2017 | Tran | H04L 67/10 |
| | | | | 434/247 |
| 2017/0243208 | A1* | 8/2017 | Kurian | G06Q 20/40 |
| 2017/0330179 | A1* | 11/2017 | Song | G06Q 20/065 |
| 2017/0344640 | A1* | 11/2017 | Goldstein | G06F 16/3344 |
| 2018/0307854 | A1* | 10/2018 | Bernau | G06N 3/08 |
| 2019/0229890 | A1* | 7/2019 | Brehmer | H04L 9/3242 |

OTHER PUBLICATIONS

International Search Report and Written Opinion of PCT Application No. PCT/JP2018/026913, dated Jul. 7, 2018, 08 pages of ISRWO.
Milanie Swan, "Blockchain—Blueprint for a New Economy", O'Reilly Media, Inc, Feb. 2015, 149 pages.
Andreas M. Antonopoulos, "Mastering Bitcoin", O'Reilly Media, Inc, Dec. 2014, 298 pages.
Sakakibara, et al., "An FPGA NIC Based Caching for Blockchain Databases", The Institute of Electronics, Information and Communication Engineers, IEICE Technical Report, vol. 117, No. 153, Jul. 19, 2017, pp. 165-170.
Melanie Swan, "Blockchain—Blueprint for a New Economy", O'Reilly Media, Inc, Feb. 2015, 149 pages.
Andreas M. Antonopoulos, "Mastering Bitcoin—Unlocking Digital Cryptocurrencies", O'Reilly Media, Inc, Dec. 2014, 298 pages.
Office Action for EP Patent Application No. 18856046.0, dated May 3, 2021, 5 pages of Office Action.

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/026913 filed on Jul. 18, 2018, which claims priority benefit of Japanese Patent Application No. JP 2017-177084 filed in the Japan Patent Office on Sep. 14, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, services each using a peer-to-peer database such as blockchain data disclosed in Non-Patent Document 1 below have been actively developed. Bitcoin disclosed in Non-Patent Document 2 below or the like can be cited as an example, Bitcoin using blockchain data for exchange of virtual currency.

CITATION LIST

Non-Patent Document

Non-Patent Document 1: Melanie Swan, "Blockchain", (U.S.), O'Reilly Media, 2015-01-22
Non-Patent Document 2: Andreas M. Antonopoulos, "Mastering Bitcoin", (U.S.), O'Reilly Media, 2014-12-01

SUMMARY OF THE INVENTION

Problems to be Solved by the Invention

Here, a peer-to-peer database such as blockchain data has lower processing performance than that of a centralized database, and the more access is made, or the more data amount is acquired from the peer-to-peer database in one-time access, the longer the time required for output tends to be. In other words, there have been cases where it is difficult to deal with a large amount of request information (for example, a query or the like) without increasing the load on the peer-to-peer database system.

Therefore, the present disclosure has been made in view of the problems described above, and the purpose of the present disclosure is to provide a novel and improved information processing apparatus, a novel and improved information processing method, and a novel and improved program that can deal with a larger amount of request information without increasing the load on the peer-to-peer database system.

Solution to Problems

According to the present disclosure, an information processing apparatus is provided including an acquisition unit that acquires data provided from a P2P database on the basis of request information, and a storage control unit that controls storage of the data performed by a cache storage unit.

In addition, according to the present disclosure, an information processing method executed by a computer is provided, the method including acquiring data provided from a P2P database on the basis of request information, and controlling storage of the data performed by a cache storage unit.

Furthermore, according to the present disclosure, a program is provided, the program causing a computer to acquire data provided from a P2P database on the basis of request information, and to control storage of the data performed by a cache storage unit.

Effects of the Invention

As described above, according to the present disclosure, it is possible to deal with more request information without increasing the load on the peer-to-peer database system.

Note that the effects described above are not necessarily limited, and along with or in lieu of the effects described above, any of the effects described in the present Description, or another effect that can be grasped from the present Description may be exhibited.

MODE FOR CARRYING OUT THE INVENTION

Hereinafter, a preferred embodiment of the present disclosure will be described in detail with reference to the accompanying drawings. Note that in the present Description and the drawings, the same reference signs denote constituents having substantially the same functional configuration and an overlapping description will be omitted.

Note that the description will be given in the following order.

1. Overview of peer-to-peer database
2. Embodiment
2.1. Overview
2.2. System configuration example
2.3. Functional configuration example of cache apparatus 100
2.4. Functional configuration example of node apparatus 200
2.5. Process flow
3. Hardware configuration example
4. Summary

1. OVERVIEW OF PEER-TO-PEER DATABASE

Before describing an embodiment of the present disclosure, first, an overview of a peer-to-peer database will be described.

In an information processing system according to the present embodiment, a distributed peer-to-peer database distributed in a peer-to-peer network is used. Note that the peer-to-peer network is also referred to as a peer-to-peer distributed file system in some cases. Hereinafter, the peer-to-peer network is referred to as a "P2P network" and the peer-to-peer database is referred to as a "P2P database" in some cases. As an example of the P2P database, blockchain data distributed in a P2P network is used in some cases. Therefore, first, an outline of a blockchain system will be described as an example.

Figure 1:
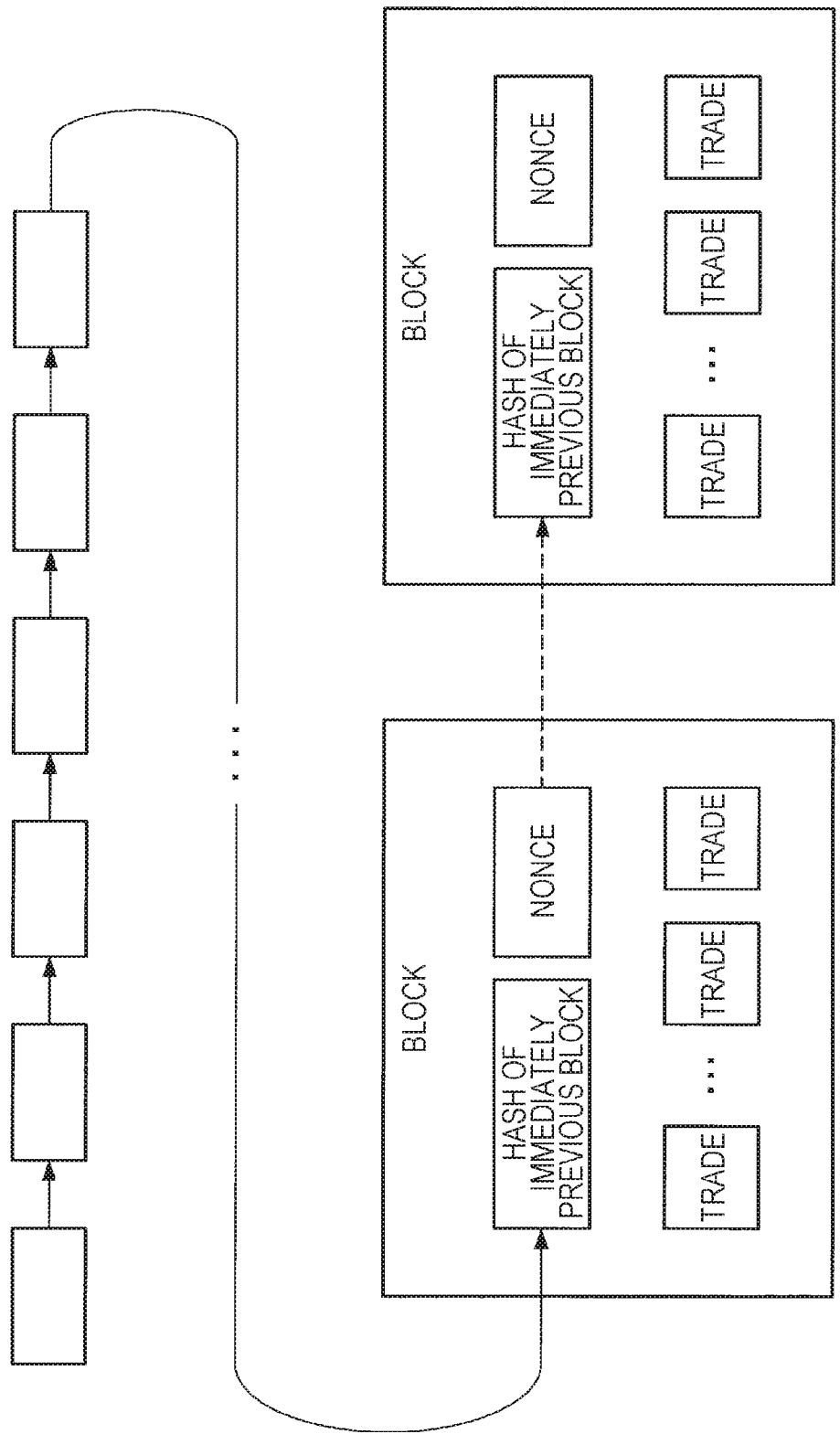
FIG. 1 is a diagram illustrating an outline of blockchain data which is one type of a P2P database.

As illustrated in FIG. 1, blockchain data is data including a plurality of blocks connected like a chain. In each block, one or two or more pieces of target data can be stored as a transaction or transactions (trade or trades).

Blockchain data used for exchanging virtual currency data such as Bitcoin or the like can be cited as an example of the block chain data. The blockchain data used for exchanging virtual currency data includes, for example, a hash of the immediately previous block and a value called a nonce. The hash of the immediately previous block is information used to determine whether or not the block is a "correct block" that is correctly connected to the immediately previous block. The nonce is information used for preventing spoofing in authentication using a hash, and falsification is prevented by using the nonce. A character string, a numeric string, data indicating a combination thereof, or the like can be cited as an example of the nonce.

In addition, in the blockchain data, data of each transaction is given an electronic signature using a cryptographic key or is encrypted by using a cryptographic key. Furthermore, data of each transaction is disclosed and shared throughout the P2P network.

Figure 2:
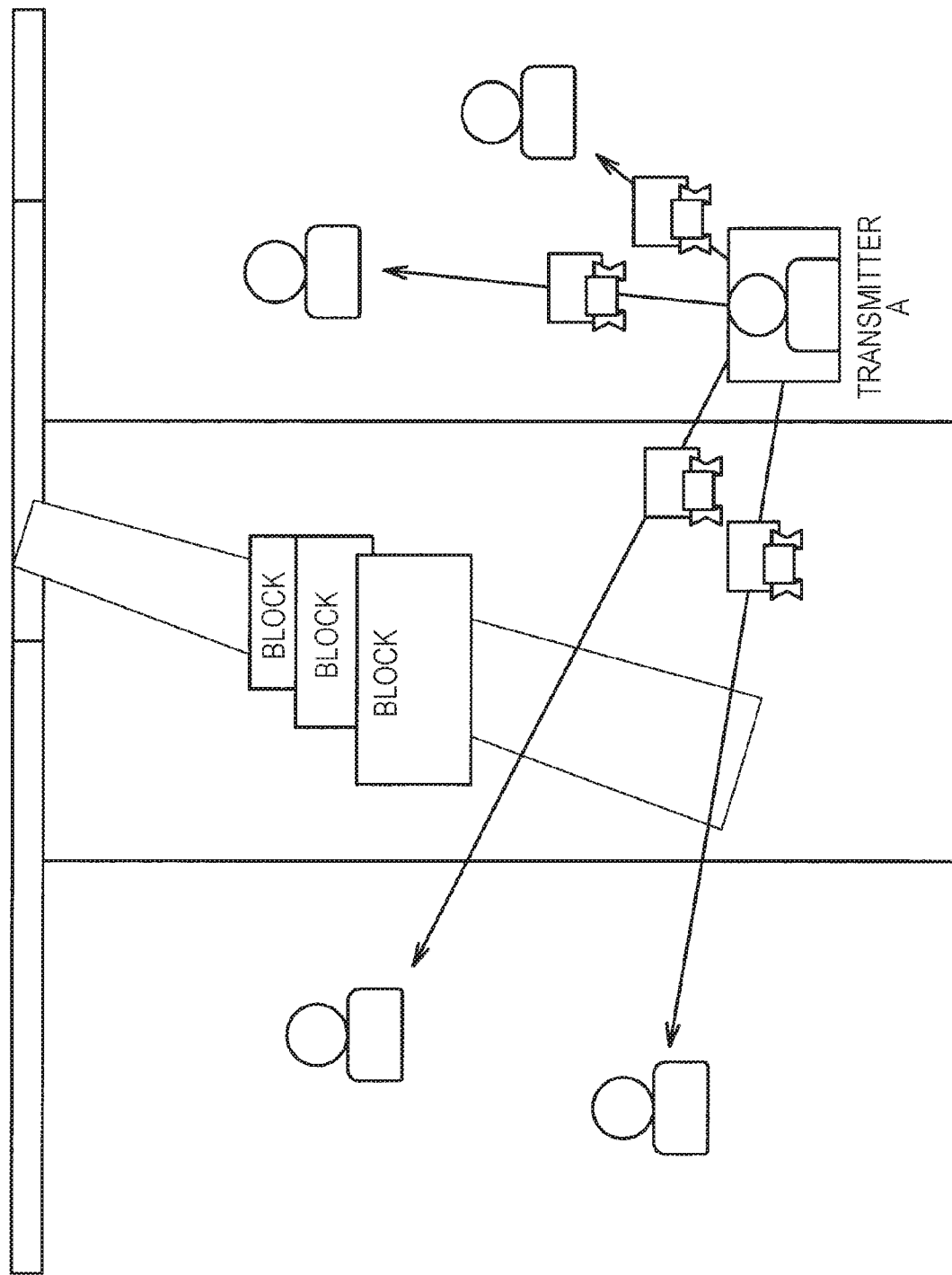
FIG. 2 is a diagram illustrating an outline of blockchain data which is one type of the P2P database.

FIG. 2 is a diagram illustrating a state in which target data is registered by a user A in the blockchain system. The user A electronically signs the target data to be registered to the blockchain data by using a private key of the user A. Then, the user A broadcasts a transaction including the electronically signed target data on the P2P network. As a result, it is ensured that the owner of the target data is the user A.

Figure 3:
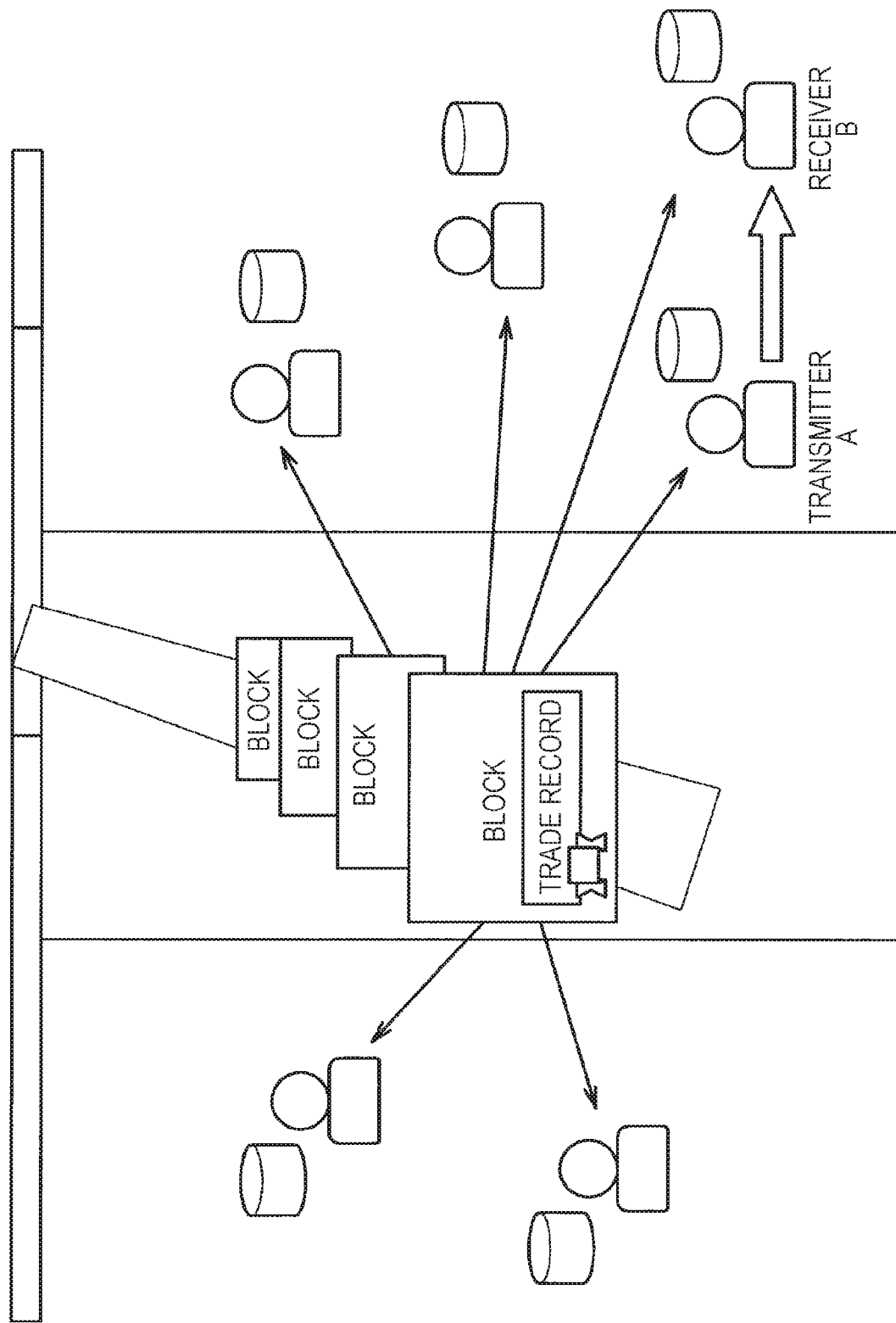
FIG. 3 is a diagram illustrating an outline of the blockchain data which is one type of the P2P database.

FIG. 3 is a diagram illustrating a state in which target data is transferred from the user A to a user B in the blockchain system. The user A electronically signs the transaction by using the private key of the user A, and makes the transaction include a public key of the user B. Therefore, it is indicated that the target data has been transferred from the user A to the user B. Furthermore, the user B may acquire the public key of the user A from the user A and acquire the electronically signed or encrypted target data, upon trading of the target data.

Furthermore, in the blockchain system, for example, by using a sidechain technology, it is possible to make blockchain data used for exchanging existing virtual currency data include other target data different from virtual currency. An example of the blockchain data is Bitcoin blockchain data.

2. EMBODIMENT

The overview of the P2P database has been described above. Subsequently, an embodiment according to the present disclosure will be described.

(2.1. Overview)

First, an outline of the present disclosure will be described.

As described above, the information processing system that manages data by using a P2P database such as blockchain data can prevent falsification or the like of data and can ensure authenticity of the data. However, a P2P database generally has lower processing performance than that of a centralized database, and the more access is made, or the more the data amount is acquired from the P2P database in one-time access, the longer the time required for output tends to be.

In view of the circumstances described above, the disclosing party of the present case has created the present disclosure. An information processing system according to the present disclosure realizes the function of caching data acquired from the P2P database on the basis of request information (for example, a query or the like). As a result, the information processing system can provide cached data to the user without accessing the P2P database in a case where the data requested according to the request information from the user has been cached. In other words, the information processing system according to the present disclosure can deal with more request information without increasing the load on the P2P database system.

Furthermore, the information processing system according to the present disclosure can determine whether or not data should be cached according to a predetermined determination logic, instead of caching all the pieces of data acquired from the P2P database. More specifically, the information processing system according to the present disclosure can determine whether or not data requested according to request information should be cached on the basis of content requested according to the request information, frequency requested according to the request information, the time taken for acquiring the data requested according to the request information, or the like. For example, in a case where occurrence frequency of the same request information is higher than a predetermined value and pieces of data acquired according to the request information is the same with each other, the information processing system according to the present disclosure may determine that the data acquired according to the request information should be cached. As a result, the information processing system according to the present disclosure can cache only appropriate data, and therefore can prevent an erroneous answer. For example, in a case where even though request information is the same, data acquired according to the request information differs every time, the information processing system according to the present disclosure can prevent erroneous data cached only because the request information is the same from being provided. Furthermore, the information processing system according to the present disclosure can reduce the amount of data to be cached. Note that the determination logic as to whether or not to cache data acquired from the P2P database is not limited to the above.

Furthermore, the information processing system according to the present disclosure registers information that can uniquely identify cached data (hereinafter referred to as "cache data specifying information" for convenience) to the P2P database. For example, the information processing system according to the present disclosure registers the hash value of cached data to the P2P database. As a result, for example, in a case where the data provided for request information is data provided from a cache and authenticity of the data is required to be confirmed, the information processing system according to the present disclosure can confirm authenticity of the data by confirming that the same value as the hash value calculated by using the data is registered to the P2P database. In other words, because of the above mechanism, the information processing system according to the present disclosure can prevent a decrease in reliability due to provision of cached data. Note that the cache data specifying information is not limited to the hash value of the cached data. Furthermore, an information processing system other than the information processing system according to the present disclosure may check authenticity of the data by using the method described above, as long as the information processing system can access a P2P database.

Note that before the cache data specifying information is registered to the P2P database, the information processing system according to the present disclosure can confirm that data that is same as the cashed data is acquired from the P2P database (hereinafter, this process is referred to as "process related to a consensus" in some cases) on the basis of pieces of request information same with each other in respective node apparatuses that hold the P2P databases. Then, in a case where the respective node apparatuses confirm that the same data as the cached data is acquired from the P2P databases on the basis of the pieces of request information same with each other, the cache data specifying information is registered to the P2P database. Therefore, authenticity of the data can be ensured more reliably. Note that cache data specifying information may be registered to the P2P database in a case where a predetermined condition (for example, in a case where a specific node apparatus has successfully performed the confirmation described above, in a case where more than a predetermined number of node apparatuses has successfully performed the confirmation described above, or the like) is satisfied, in addition to the case where all the node apparatuses have successfully performed the confirmation described above.

Furthermore, as described above, the information processing system according to the present disclosure can return cached data to request information that the information processing system has dealt with in the past. In addition, even in a case where the information processing system receives new request information, the information processing system according to the present disclosure can deal with the new request information by using cached data without accessing the P2P database in some cases. More specifically, the information processing system according to the present disclosure understands the content of new request information by analyzing the new request information. In a case where the new request information can be reconstructed from past request information, the information processing system can deal with the new request information by reconstructing the cached data in some cases. As a result, the information processing system according to the present disclosure can further decrease the load on the P2P database system and can deal with more request information.

Note that the present disclosure may be applied to any system, apparatus, service, and the like as long as a P2P database is used. Hereinafter, a case where the present disclosure is applied to an information processing system that provides a learning achievement and activity recording service will be described. Here, the learning achievement and activity recording service is a service through which each educational institution (for example, a nursery school, a kindergarten, an elementary school, a junior high school, a high school, a university, a graduate school, a learning cram school, a cramming school, a license school, or the like) registers a learning achievement record (for example, a record regarding an exam result, obtained credits, an obtained qualification, or the like) of a student, an activity record (for example, a record regarding club activities, student council activities, an attendance status, or the like) of the student, and the like to the P2P database and manages them. As a result, authenticity of the learning achievement record and activity record of the student is ensured. The service can be used, for example, in a case where a user submits information associated with an exam result, obtained credits, and the like to a school whose entrance exam the user intends to take, a company at which the user is going to work, or the like. Note that content of the learning achievement and activity recording service is not limited to the above. For example, the learning achievement and activity recording service may be used by an institution other than an educational institution, and a record regarding the social experience, the work history, or the like of a target person may be registered to the P2P database and may be managed.

(2.2. System Configuration Example)

The outline of the present disclosure has been described above. Subsequently, with reference to FIG. 4, a configuration example of the information processing system according to the present embodiment will be described.

Figure 4:
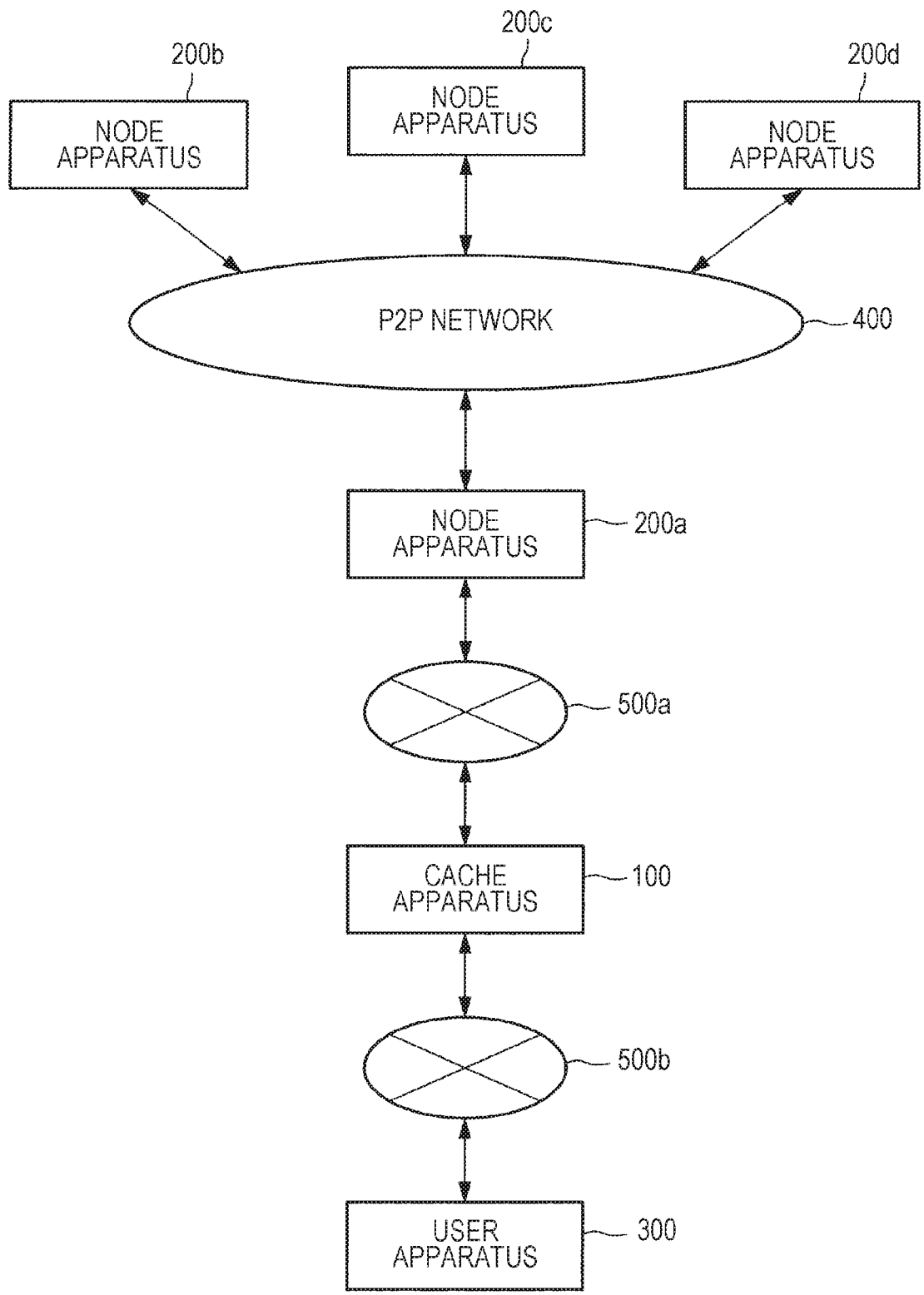
FIG. 4 is a diagram illustrating a configuration example of an information processing system according to the present embodiment.

As illustrated in FIG. 4, the information processing system according to the present embodiment includes a cache apparatus 100, a plurality of node apparatuses 200 (node apparatuses 200*a* to 200*d* in FIG. 4), and a user apparatus 300. Furthermore, each of the plurality of node apparatuses 200 is connected to a P2P network 400. Moreover, the cache apparatus 100 and the node apparatus 200*a* are connected by a network 500*a*, and the cache apparatus 100 and the user apparatus 300 are connected by a network 500*b*. Note that the configuration of the information processing system according to the present embodiment is not limited to the configuration of FIG. 4. For example, the number of each of the apparatuses included in the information processing system may be changed as appropriate. Furthermore, the cache apparatus 100 may be connected to a node apparatus 200 other than the node apparatus 200*a*.

(Cache Apparatus 100)

The cache apparatus 100 is an information processing apparatus that caches data acquired from the P2P database on the basis of request information (for example, a query, or the like). More specifically, in a case where the cache apparatus 100 acquires request information requesting data registered to the P2P database from the user apparatus 300, the cache apparatus 100 provides the request information to the node apparatus 200. Then, in a case where the node apparatus 200 acquires data from the P2P database by using the request information and provides the data to the cache apparatus 100, the cache apparatus 100 not only provides the data to the user apparatus 300 but also caches the data in the cache apparatus 100.

As a result, in a case where data to be requested thereafter by the user apparatus 300 has been cached, the cache apparatus 100 can provide to the user apparatus 300 the cached data without requesting the node apparatus 200 to acquire the data. As a result, the cache apparatus 100 can deal with more request information without increasing the load on the P2P database system.

Note that as described above, the cache apparatus 100 can also determine whether or not data should be cached according to a predetermined determination logic, instead of caching all the pieces of data acquired from the P2P database. Furthermore, in a case where the cache apparatus 100 caches data acquired from the P2P database, the cache apparatus 100 can request the node apparatus 200 to register cache data specifying information to the P2P database. Registering the cache data specifying information to the P2P database enables the cache apparatus 100 to check authenticity of the cached data. Moreover, the cache apparatus 100 understands the content of new request information provided from the user apparatus 300 by analyzing the new request information. In a case where the new request information can be reconstructed from past request information, the cache apparatus 100 can deal with the new request information by reconstructing the cached data.

Note that the type of the cache apparatus 100 is not particularly limited. For example, the cache apparatus 100 may be any apparatus as long as the apparatus includes a storage medium capable of caching data, such as a general-purpose computer, a personal computer (PC), a tablet PC, or the like.

(Node Apparatus 200)

The node apparatus 200 is an information processing apparatus that is connected to the P2P network 400 and has a P2P database. Then, the node apparatus 200 can acquire data from the P2P database and can register data to the P2P database. For example, the node apparatus 200 can acquire data from the P2P database on the basis of request information provided from the user apparatus 300 via the cache apparatus 100, and can provide the data to the cache apparatus 100. Furthermore, the node apparatus 200 can register cache data specifying information to the P2P database on the basis of a request from the cache apparatus 100.

Furthermore, as described above, before the cache data specifying information is registered to the P2P database, the respective node apparatuses 200 can confirm that data that is same as the cashed data is acquired from the P2P databases (in other words, can perform the process related to a consensus) on the basis of the pieces of request information same with each other. As a result, the node apparatus 200 can ensure authenticity of data more reliably.

Note that in a case where the node apparatus 200 acquires data from the P2P database, a case where the node apparatus 200 registers data to the P2P database, and the like, the node apparatus 200 basically uses a predetermined program (for example, a chain code, or the like) provided in the P2P database and executed on the P2P database. By using the program, for example, various processes other than a trade of virtual currency such as Bitcoin are realized according to a predetermined rule. Hereinafter, a predetermined program provided in the P2P database and executed on the P2P database is referred to as a "P2P database program". Note that the node apparatus 200 may appropriately use also a program other than the P2P database program to acquire data from the P2P database and to register data to the P2P database. Furthermore, similarly to the cache apparatus 100, the type of the node apparatus 200 is not particularly limited.

Furthermore, in the present embodiment, an example in which the plurality of node apparatuses 200 has the same function will be described. However, node apparatuses 200 may have functions different from each other. For example, a node apparatus 200 (for example, an endorsing peer, or the like) that approves registration of data (transaction) to the P2P database, a node apparatus 200 (for example, an ordering peer, or the like) that instructs each node apparatus 200 to register the data after approval, a node apparatus 200 (for example, a committing peer, or the like) that registers the data in the P2P database may be provided.

(P2P Network 400)

The P2P network 400 is a network in which a P2P database is distributed. As described above, by connecting each node apparatus 200 to the P2P network 400, each node apparatus can update the P2P database while maintaining consistency with the P2P databases held by the other node apparatuses 200.

Note that the type of the P2P network 400 is not particularly limited. For example, the type of the P2P network 400 may be any of a consortium type operated by a plurality of organizations, a private type operated by a single organization, or a public type that does not specifically limit participants.

Note that the communication system, the type of channel, and the like used for the P2P network 400 are not particularly limited. For example, the P2P network 400 may be realized by a dedicated channel network such as an Internet protocol-virtual private network (IP-VPN). Furthermore, the P2P network 400 is realized by a public network such as the Internet, a telephone network, a satellite communication network, various local area networks (LANs) including Ethernet (registered trademark), a wide area network (WAN), or the like. Moreover, the P2P network 400 may be realized by a wireless communication network such as Wi-Fi (registered trademark), Bluetooth (registered trademark), or the like.

(User Apparatus 300)

The user apparatus 300 is an apparatus for a user that uses the learning achievement and activity recording service. For example, the user apparatus 300 may be an apparatus for a student or the like who uses the learning achievement and activity recording service. The user operates the user apparatus 300 to create request information for requesting data such as learning achievement record of a student (for example, a record regarding an exam result, obtained credits, an obtained qualification, or the like), a student activity record (for example, a record regarding club activities, student council activities or attendance status) or the like, the data being registered in the P2P database, and to provide the request information to the cache apparatus 100. Thus, the user can obtain the data. Note that similarly to the cache apparatus 100, the type of the user apparatus 300 is not particularly limited.

(Network 500)

The network 500 is a network that connects the node apparatus 200 and the cache apparatus 100, and the cache apparatus 100 and the user apparatus 300. Note that similarly to the P2P network 400, the communication system, the type of channel, and the like used for the network 500 are not particularly limited.

A configuration example of the information processing system according to the present embodiment has been described above. Note that the configuration described above with reference to FIG. 4 is only an example, and the configuration of the information processing system according to the present embodiment is not limited to such an example. For example, the node apparatus 200 or the user apparatus 300 may have the function of the cache apparatus 100. For example, software that provides the function of the cache apparatus 100 (for example, a web application using a predetermined application programming interface (API), or the like) may be executed on the node apparatus 200 or the user apparatus 300. Furthermore, the cache apparatus 100 or the user apparatus 300 may have the function of the node apparatus 200. In other words, the cache apparatus 100 or the user apparatus 300 may participate in the P2P network 400. The configuration of the information processing system according to the present embodiment can be flexibly modified according to specifications and operations.

(2.3. Functional Configuration Example of Cache Apparatus 100)

A configuration example of the information processing system according to the present embodiment has been described above. Subsequently, a functional configuration example of the cache apparatus 100 will be described with reference to FIG. 5.

Figure 5:
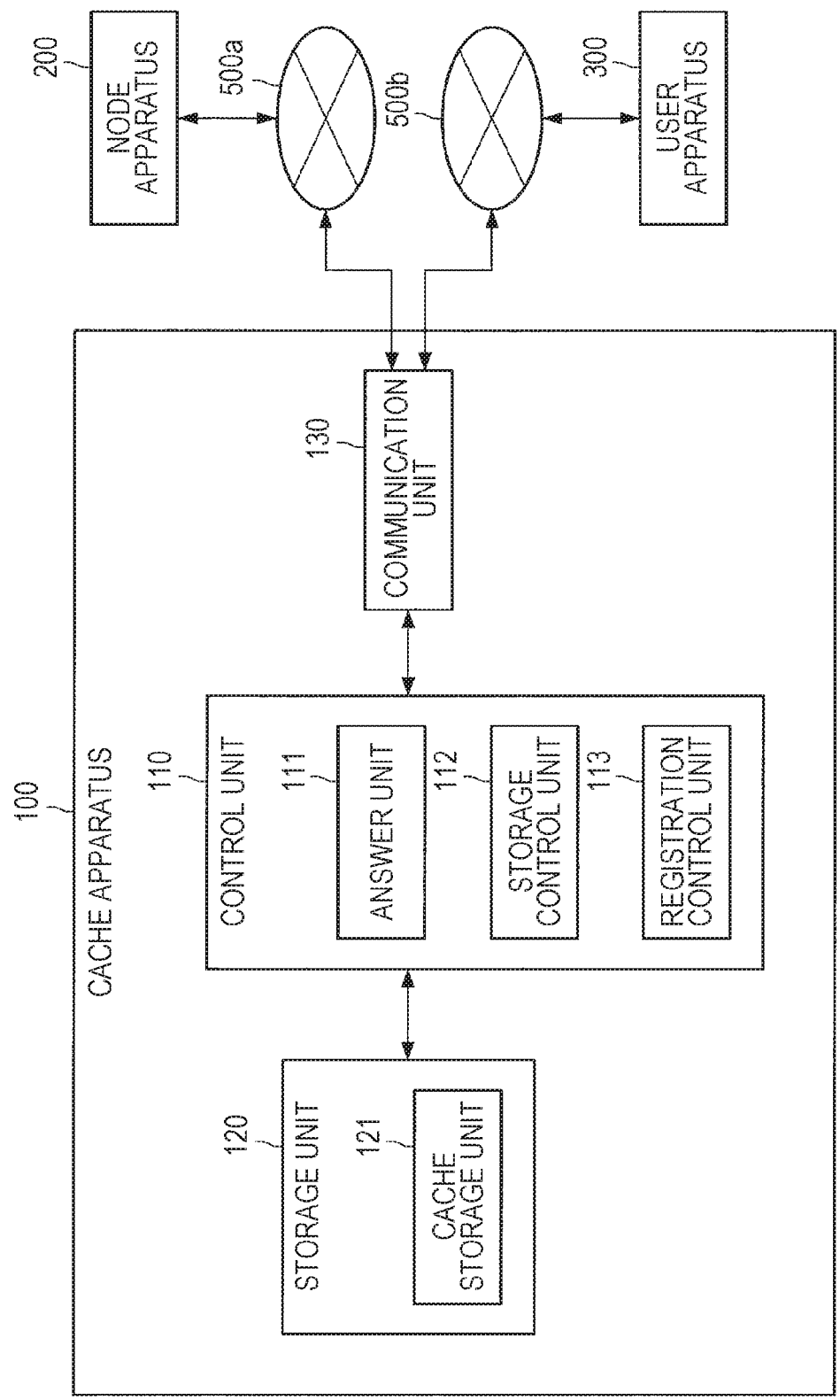
FIG. 5 is a block diagram illustrating a functional configuration example of a cache apparatus 100 according to the present embodiment.

As illustrated in FIG. 5, the cache apparatus 100 includes a control unit 110, a storage unit 120, and a communication unit 130. Furthermore, the control unit 110 includes an answer unit 111, a storage control unit 112, and a registration control unit 113, and the storage unit 120 includes a cache storage unit 121.

(Control Unit 110)

The control unit 110 has a functional configuration of comprehensively controlling the overall processes performed by the cache apparatus 100. For example, the control unit 110 can control start and stop of each configuration, and can control, for example, an output unit (not illustrated) such as a display, a speaker, or the like by creating a control signal. Note that the control content of the control unit 110 is not limited to them. For example, the control unit 110 may control processes generally performed in a general-purpose computer, a PC, a tablet PC, or the like.

(Answer Unit 111)

The answer unit 111 functions as an acquisition unit that acquires data provided from the P2P database on the basis of request information, and has a functional configuration of providing the data to the user apparatus 300 as an answer to the request information. For example, in a case where the answer unit 111 determines that the content of new request information provided from the user apparatus 300 is the same as the content of the request information that the answer unit 111 has dealt with in the past, the answer unit 111 can provide the cached data to the user apparatus 300. For example, a case where the answer unit 111 has previously dealt with request information A "to acquire data corresponding to condition A" will be considered as an example. If the content of new request information provided from the user apparatus 300 is "to acquire data corresponding to the condition A", the answer unit 111 may determine that the content of the new request information is same as the content of the request information that the answer unit 111 has dealt with in the past, and may provide cached answer data to the request information A to the user apparatus 300.

Furthermore, the answer unit 111 understands the content of new request information provided from the user apparatus 300 by analyzing the new request information. In a case where the new request information can be reconstructed from the past request information, the answer unit 111 can deal with the new request information by reconstructing the cached data. For example, a case where the answer unit 111 has previously dealt with request information A "to acquire data corresponding to condition A" and request information B "to acquire data corresponding to condition B" will be considered as an example. If the content of new request information provided from the user apparatus 300 is "to acquire data corresponding to condition A or condition B", the new request information can be reconstructed by the logical sum (OR) of the past request information A and the past request information B. Therefore, the answer unit 111 may create answer data by outputting the logical sum (OR) of the answer data of the request information A and the request information B. Furthermore, if the content of new request information provided from the user apparatus 300 is "to acquire data corresponding to condition A and condition B", the new request information can be reconstructed by the logical product (AND) of the past request information A and the past request information B. Therefore, the answer unit 111 may create answer data by outputting the logical product (AND) of the answer data of the request information A and the request information B. Note that the processes described above are only examples, and the method of creating answer data is not limited to the above. For example, if new request information can be reconstructed by performing some process (for example, computation, or the like) on the past request information, cached data may be reconstructed and provided.

As a result, by reducing access to the P2P database, the answer unit 111 can reduce the load on the P2P database and can provide an answer to the user apparatus 300 more quickly.

Note that in a case where the answer unit 111 determines that it is not possible to deal with request information by using the cached data, the answer unit 111 provides request information to the node apparatus 200. Then, in a case where the node apparatus 200 acquires data corresponding to the request information from the P2P database and provides the data to the cache apparatus 100, the answer unit 111 provides the data to the user apparatus 300.

Furthermore, instead of providing data itself acquired from the P2P database to the user apparatus 300, the answer unit 111 may arrange the data in an arbitrary storage location (for example, a storage provided in another apparatus, or the like), and may provide information associated with the storage location (for example, information associated with a link destination such as a URL or the like) to the user apparatus 300. Even in this case, the data arranged in the storage location is cached, cache data specifying information that uniquely specifies the data is registered to the P2P database, and therefore authenticity of the data is ensured.

Furthermore, the answer unit 111 may add, to the data to be provided, information indicating whether the data provided to the user apparatus 300 is data provided from the cache or data acquired from the P2P database. As a result, the user who receives the data can use the information as a material for determining whether or not to check authenticity of the data.

(Storage Control Unit 112)

The storage control unit 112 has a functional configuration of controlling the cache of data corresponding to request information, the data having been acquired from the P2P database by the node apparatus 200. More specifically, the storage control unit 112 can determine whether or not data acquired from the P2P database should be cached. More specifically, the storage control unit 112 can determine whether or not data requested according to request information should be cached on the basis of content requested by the request information, frequency requested by the request information, the time taken for acquiring the data, or the like. For example, in a case where occurrence frequency of the same request information is higher than a predetermined value and the data acquired according to the request information is the same every time, the storage control unit 112 may determine that the data acquired according to the request information should be cached. In other words, in a case where even if the request information is the same, data acquired according to the request information differs every time (for example, in a case where data to be acquired changes day by day such as a case where request information is "to acquire today's attendance status", or the like), the storage control unit 112 may determine that the data acquired by the request information should not be cached. As a result, the storage control unit 112 can cache only appropriate data, and therefore an erroneous answer given by the answer unit 111 can be prevented. For example, in a case where even though request information is the same, data acquired according to the request information differs every time, the storage control unit 112 can prevent erroneous data cached only because the request information is the same from being provided as the answer.

Furthermore, in a case where request information is complicated (for example, in a case where it is necessary to acquire data from a greater number of blocks than a predetermined number in blockchain data, which is a type of the P2P database, or the like) and it takes a longer time to acquire data on the basis of request information than predetermined time, the storage control unit 112 may determine that data to be acquired according to the request information should be cached. As a result, the storage control unit 112 can improve the answering speed for complex request information. Furthermore, the storage control unit 112 can reduce the amount of data to be cached. Note that the method of determining whether or not to cache data is not limited to the above. For example, the storage control unit 112 may use a machine learning technology to cache data by using a predetermined number or more patterns of determination logics and to learn a more effective determination method. Thus, the storage control unit 112 may improve the determination logics.

Furthermore, in a case where the storage control unit 112 determines that data acquired from the P2P database should be cached, the storage control unit 112 may give identification information of the cached data (hereinafter referred to as "cache ID" for convenience), and the answer unit 111 may provide the cache ID together with the data to the user apparatus 300. As a result, thereafter, the user can request cached data by providing not a query but the cache ID as request information to the cache apparatus 100. In other words, the user can explicitly request acquisition of data from the cache rather than from the P2P database. In a case where the cache ID is provided as request information, the answer unit 111 acquires the data identified by the cache ID from the cache and provides the data to the user apparatus 300.

Note that the cache ID may not be identification information of cached data but may be identification information of a query used for data acquisition. Therefore, in some cases, the user can acquire data by using a cache ID instead of a query, from the second time and onward. For example, in a case where the user intends to acquire ten pieces of data at a time and to acquire a total of 100 pieces of data (data 1 to data 100), the user at first provides the query "to acquire data of data 1 to data 10" to the cache apparatus 100. Then, from the second time and onward, the user can acquire the data by providing to the cache apparatus 100 not a query but the cache ID and information associated with the data range (for example, "data 11 to data 20" or the like). In other words, by using the cache ID as query identification information, a data request is realized by a simpler method.

(Registration Control Unit 113)

The registration control unit 113 has a functional configuration of controlling registration of cache data specifying information to the P2P database. More specifically, in a case where the storage control unit 112 determines that data acquired from the P2P database should be cached and the data is stored in the cache storage unit 121, the registration control unit 113 requests the node apparatus 200 to register the cache data specifying information to the P2P database.

Here, the cache data specifying information is, for example, the hash value of the cached data (for example, request information, data acquired from the P2P database on the basis of the request information, or the like), the cached data itself, or the like. However, the cache data specifying information is not limited to them. More specifically, the cache data specifying information may be any information as long as the information can uniquely specify cached data. Furthermore, information registered to the P2P database is not limited to cache data specifying information. For example, identification information of the information processing system (or service or the like) that has cached data, the date and time when the data was cached, or the like may be registered to the P2P database together with the cache data specifying information.

(Storage Unit 120)

The storage unit 120 has a functional configuration of storing various types of information. For example, the storage unit 120 stores a program, a parameter, or the like used by each functional configuration of the cache apparatus 100. Note that the content of the information stored in the storage unit 120 is not particularly limited.

(Cache Storage Unit 121)

The cache storage unit 121 has a functional configuration of storing data that is determined to be cached by the storage control unit 112 out of data acquired from the P2P database. The cache storage unit 121 stores at least request information and the data acquired from the P2P database on the basis of the request information in association with each other. For example, the cache storage unit 121 may store text data, image data (binary data), data related to a link destination (for example, a uniform resource locator (URL), or the like) acquired from the P2P database on the basis of request information, or a hash value thereof, or the like is stored in association with the request information. Note that data stored in association with the request information, described above is only an example, and any data may be stored in association with request information as long as the data relates to data answered to the user apparatus 300.

As a result, the answer unit 111 can compare the request information provided from the user apparatus 300 with the request information stored in the cache storage unit 121, and can answer the request information on the basis of the comparison result by using the data cached in the cache storage unit 121. Note that the period during which the cache storage unit 121 caches data is not particularly limited.

(Communication Unit 130)

The communication unit 130 has a functional configuration of controlling various communications with the node apparatus 200 and the user apparatus 300. For example, in communication with the node apparatus 200, the communication unit 130 transmits request information or the like provided from the user apparatus 300, and receives data or the like acquired from the P2P database on the basis of the request information. Furthermore, in communication with the user apparatus 300, the communication unit 130 receives request information or the like, and transmits data or the like acquired from the P2P database on the basis of the request information. Note that the communication content of the communication unit 130 is not limited to the above.

A functional configuration example of the cache apparatus 100 has been described above. Note that the functional configuration described above with reference to FIG. 5 is only an example, and the functional configuration of the cache apparatus 100 is not limited to such an example. For example, the cache apparatus 100 does not necessarily include all the configurations illustrated in FIG. 5. Furthermore, the functional configuration of the cache apparatus 100 can be flexibly modified according to specifications or operations.

(2.4. Functional Configuration Example of Node Apparatus 200)

A functional configuration example of the cache apparatus 100 has been described above. Subsequently, a functional configuration example of the node apparatus 200 will be described with reference to FIG. 6.

Figure 6:
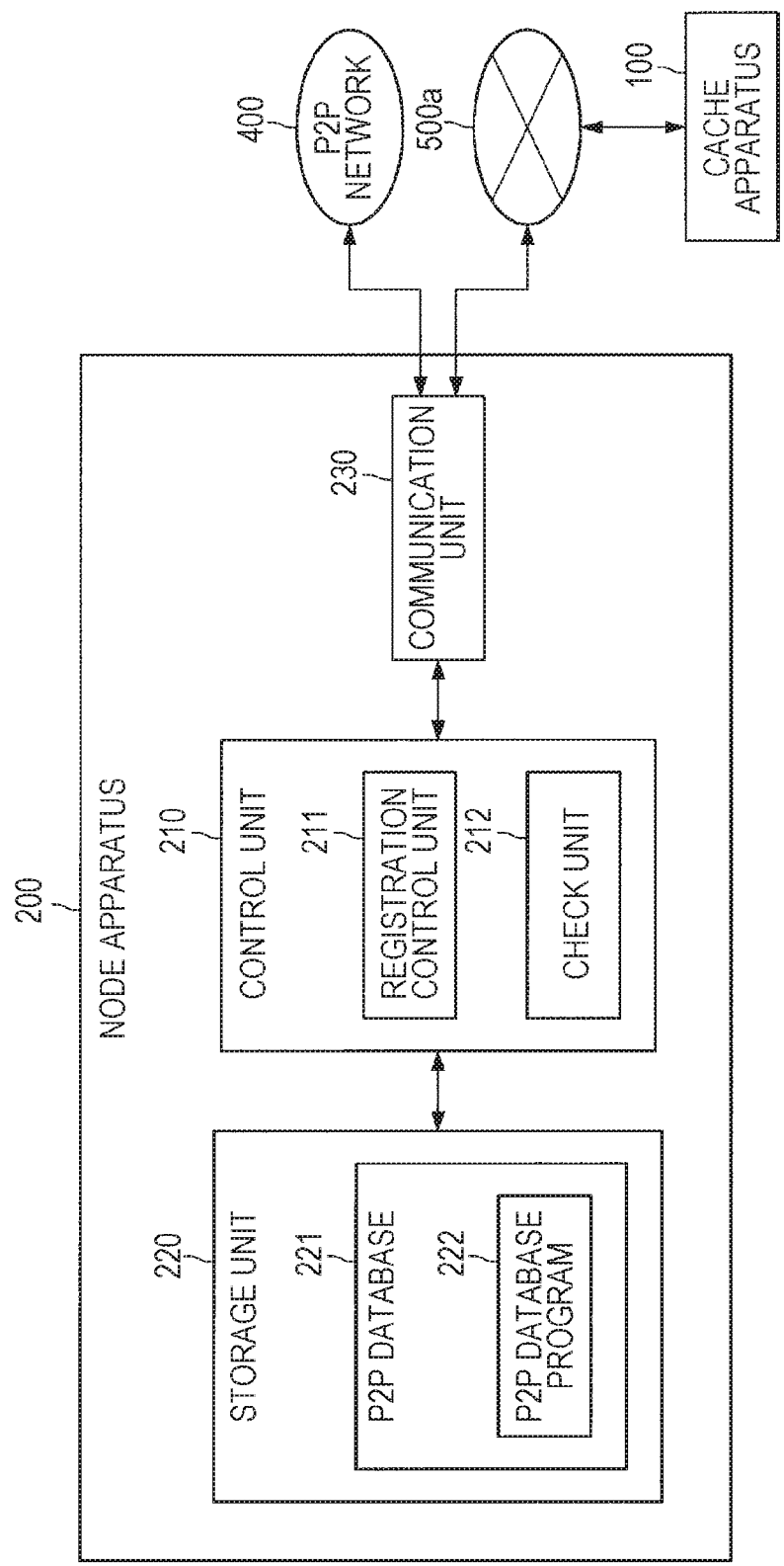
FIG. 6 is a block diagram illustrating a functional configuration example of a node apparatus 200 according to the present embodiment.

As illustrated in FIG. 6, the node apparatus 200 includes a control unit 210, a storage unit 220, and a communication unit 230. In addition, the control unit 210 includes a registration control unit 211 and a check unit 212. Furthermore, the storage unit 220 includes a P2P database 221, and a P2P database program 222 is provided in the P2P database 221.

(Control Unit 210)

The control unit 210 has a functional configuration of comprehensively controlling the overall processes performed by the node apparatus 200. For example, the control unit 210 can control start and stop of each configuration, and can control, for example, an output unit (not illustrated) such as a display, a speaker, or the like by creating a control signal. Note that the control content of the control unit 210 is not limited to them. For example, the control unit 210 may control processes generally performed in a general-purpose computer, a PC, a tablet PC, or the like.

(Registration Control Unit 211)

The registration control unit 211 has a functional configuration of controlling registration to the P2P database 221. More specifically, the registration control unit 211 registers cache data specifying information to the P2P database 221 on the basis of a request from the registration control unit 113 of the cache apparatus 100. Furthermore, before the registration control unit 211 registers the cache data specifying information to the P2P database 221, the registration control unit 211 can confirm that data that is same as the cashed data is acquired from the P2P database 221 (can perform the process related to a consensus), on the basis of pieces of request information same with each other, in the respective node apparatuses 200.

More specifically, the registration control unit 211 broadcasts a cache data specifying information registration request to the other node apparatuses 200. At this time, the registration control unit 211 also broadcasts information associated with the cached data (for example, data acquired from the P2P database 221 on the basis of request information and the request information or the like). Then, after the registration control unit 211 of each of the other node apparatuses 200 confirms that the same data is acquired from the P2P database 221 on the basis of the same request information, the cache data specifying information is registered to the P2P database 221. As a result, the registration control unit 211 can ensure authenticity of data more reliably.

Note that the case where the registration control unit 211 may register cache data specifying information to the P2P database 221 is not limited to the case where all the node apparatuses 200 have successfully performed the confirmation described above. The registration control unit 211 may register cache data specifying information to the P2P database 221 in a case where a predetermined condition (for example, in a case where a specific node apparatus 200 has successfully performed the confirmation described above, more than a predetermined number of node apparatuses 200 has successfully performed the confirmation described above, or the like). Furthermore, the registration process to the P2P database 221 and the process related to consensus performed by the registration control unit 211 are realized by executing the P2P database program 222 provided in the P2P database 221; however, the above processes are not limited to them.

(Check Unit 212)

The check unit 212 has a functional configuration of checking authenticity of data acquired from the P2P database 221. More specifically, in a case where a user or the like (including a person who has received data from the user) requests checking of authenticity of the data, the check unit 212, for example, creates cache data identification information by using the data and request information used for acquisition of the data, and checks whether or not information same as the cache data specifying information is registered to the P2P database 221. Thus, the check unit 212 checks authenticity of the data. In a case where information same as the cache data specifying information created by using the data and the request information used to acquire the data is registered to the P2P database 221, the check unit 212 determines that the data is authentic.

Note that authenticity of the data may be checked by the check unit 212 of the node apparatus 200 other than the node apparatus 200 that has acquired the data from the P2P database 221. As a result, for example, the user can request an institution other than the institution that has acquired data to check authenticity of the data. Therefore, an unauthorized act performed by a specific institution can be prevented.

Note that the data authenticity checking process performed by check unit 212 is realized by executing the P2P database program 222 provided in the P2P database 221; however, is not limited to this.

(Storage Unit 220)

The storage unit 220 has a functional configuration of storing various types of information. For example, the storage unit 220 stores a program, a parameter, or the like used by each functional configuration of the node apparatus 200. Note that the content of information stored in the storage unit 220 is not particularly limited.

(P2P Database 221)

The P2P database 221 is a database that is commonly held by each node apparatus 200, and is, for example, blockchain data. As described above, a learning achievement record of a student (for example, a record regarding an exam result, obtained credits, an obtained qualification, or the like) of a student, an activity record (for example, a record regarding club activities, student council activities, an attendance status, or the like) of the student, cache data specifying information, and the like are registered to the P2P database 221. Various types of information registered to the P2P database 221 may be given an electronic signature using a cryptographic key, or may be encrypted by using a cryptographic key. Note that the information registered in the P2P database 221 is not limited to the above.

(P2P Database Program 222)

The P2P database program 222 is a predetermined program (for example, a chain code or the like) provided in the P2P database 221 and executed on the P2P database 221. By using the P2P database program 222, for example, various processes other than a trade of virtual currency such as Bitcoin are realized in a consistent manner according to a predetermined rule.

The P2P database program 222 can realize overall processes performed on the P2P database 221. For example, the P2P database program 222 can realize a data acquisition process, a data registration process, a process related to a consensus, the data authenticity checking process, and the like performed by accessing the P2P database 221. Note that the processes realized by the P2P database program 222 are not limited to the above. For example, the P2P database program 222 can also realize access control or the like for each user. The development language of the P2P database program 222, the number of P2P database programs 222 provided on the P2P database 221, or the like is not particularly limited.

(Communication Unit 230)

The communication unit 230 has a functional configuration of controlling various communications with the cache apparatus 100 and another node apparatus 200. For example, in communication with the cache apparatus 100, the communication unit 230 receives request information or the like provided from the user apparatus 300, and transmits data or the like acquired from the P2P database 221 on the basis of the request information. Furthermore, the communication unit 230 transmits and receives information associated with data (transaction) to be newly registered, information used for the process related to a consensus, or the like in communication with another node apparatus 200. Note that the communication content of the communication unit 230 is not limited to the above.

A functional configuration example of the node apparatus 200 has been described above. Note that the functional configuration described above with reference to FIG. 6 is only an example, and the functional configuration of the node apparatus 200 is not limited to such an example. For example, the node apparatus 200 does not necessarily have all of the configurations illustrated in FIG. 6. Furthermore, the functional configuration of the node apparatus 200 can be flexibly modified according to specifications or operations.

(2.5. Process Flow)

A functional configuration example of the node apparatus 200 has been described above. Subsequently, a process flow of each apparatus according to the present embodiment will be described.

(Flow of Answer Process for Request Information)

Figure 7:
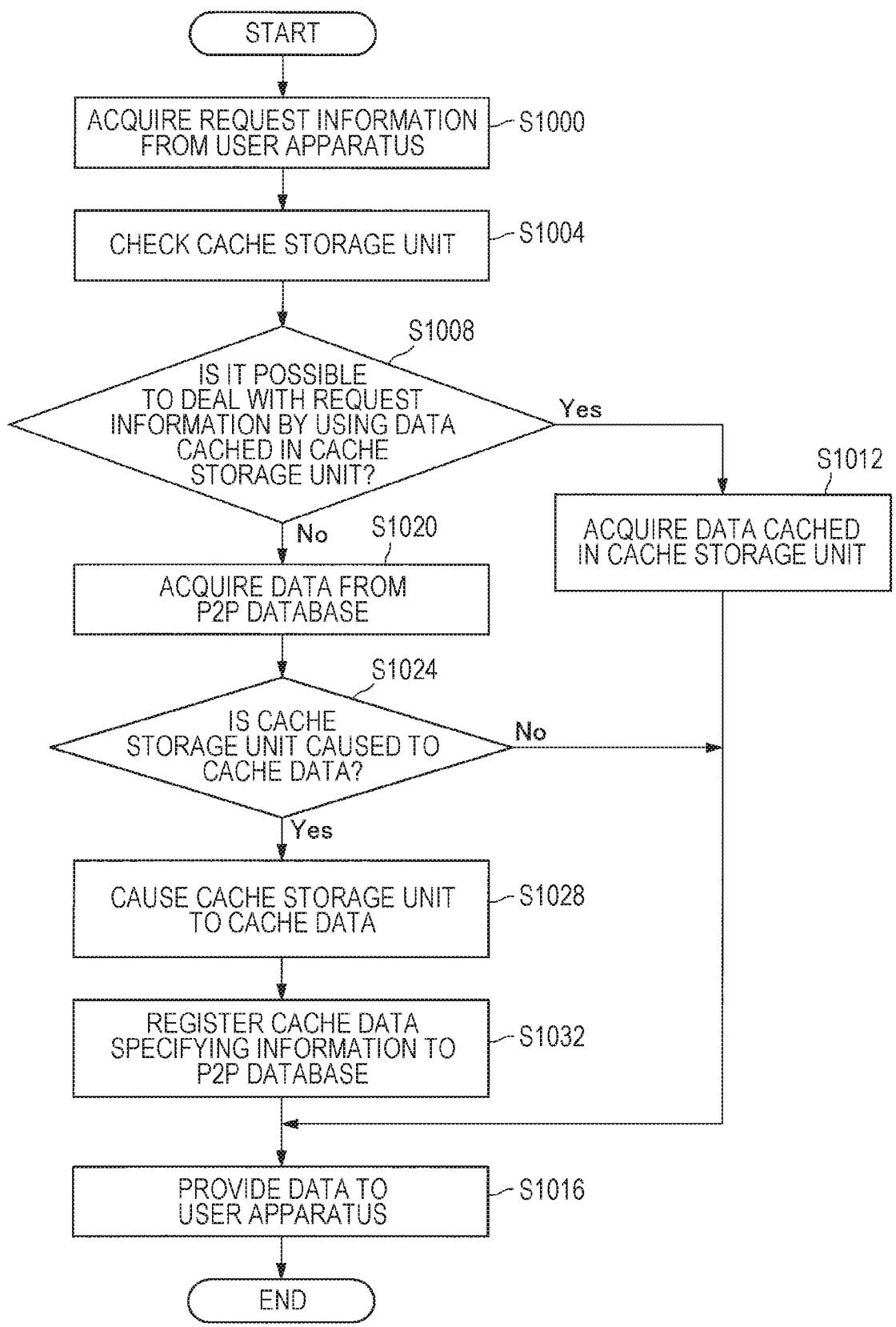
FIG. 7 is a flowchart illustrating an example of a flow of an answer process for request information provided from a user apparatus 300.

First, with reference to FIG. 7, an example of a flow of an answer process for request information provided from the user apparatus 300 will be described.

In step S1000, the answer unit 111 of the cache apparatus 100 acquires request information from the user apparatus 300. Thereafter, in step S1004, the answer unit 111 checks the cache storage unit 121. In step S1008, the answer unit 111 determines whether or not data requested according to the request information can be provided by using the data cached in the cache storage unit 121. In a case where the answer unit 111 determines that it is possible to provide the data requested according to the request information by using the cached data (step S1008/Yes), the answer unit 111 acquires the cashed data in step S1012. In step S1016, the answer unit 111 provides the data to the user apparatus 300, and the process ends.

In a case where the answer unit 111 determines that it is impossible to provide the data requested according to the request information by using the cached data (step S1008/No), in step S1020, the answer unit 111 provides the request information to the node apparatus 200 and acquires the data requested according to the request information from the P2P database 221. In step S1024, the storage control unit 112 determines whether or not the data acquired from the P2P database 221 should be cached. A specific example of the method of determining whether or not to cache data is as described above. In a case where the storage control unit 112 determines that the data acquired from the P2P database 221 should be cached (step S1024/Yes), in step S1028, the storage control unit 112 causes the cache storage unit 121 to cache the data and the request information in association with each other.

In step S1032, the registration control unit 211 of the node apparatus 200 registers cache data specifying information to the P2P database 221 in response to a request from the registration control unit 113. Note that as described above, the registration control unit 211 may perform the process related to a consensus when the cache data specifying information is registered to the P2P database 221. Furthermore, in step S1024, in a case where the storage control unit 112 determines that data acquired from the P2P database 221 should not be cached (step S1024/No), the data cache process (step S1028) and the cache data specifying information registration process (step S1032) are not performed. Thereafter, in step S1016, the answer unit 111 provides the data acquired from the P2P database 221 to the user apparatus 300, and the process ends.

(Flow of Process Related to Consensus)

Figure 8:
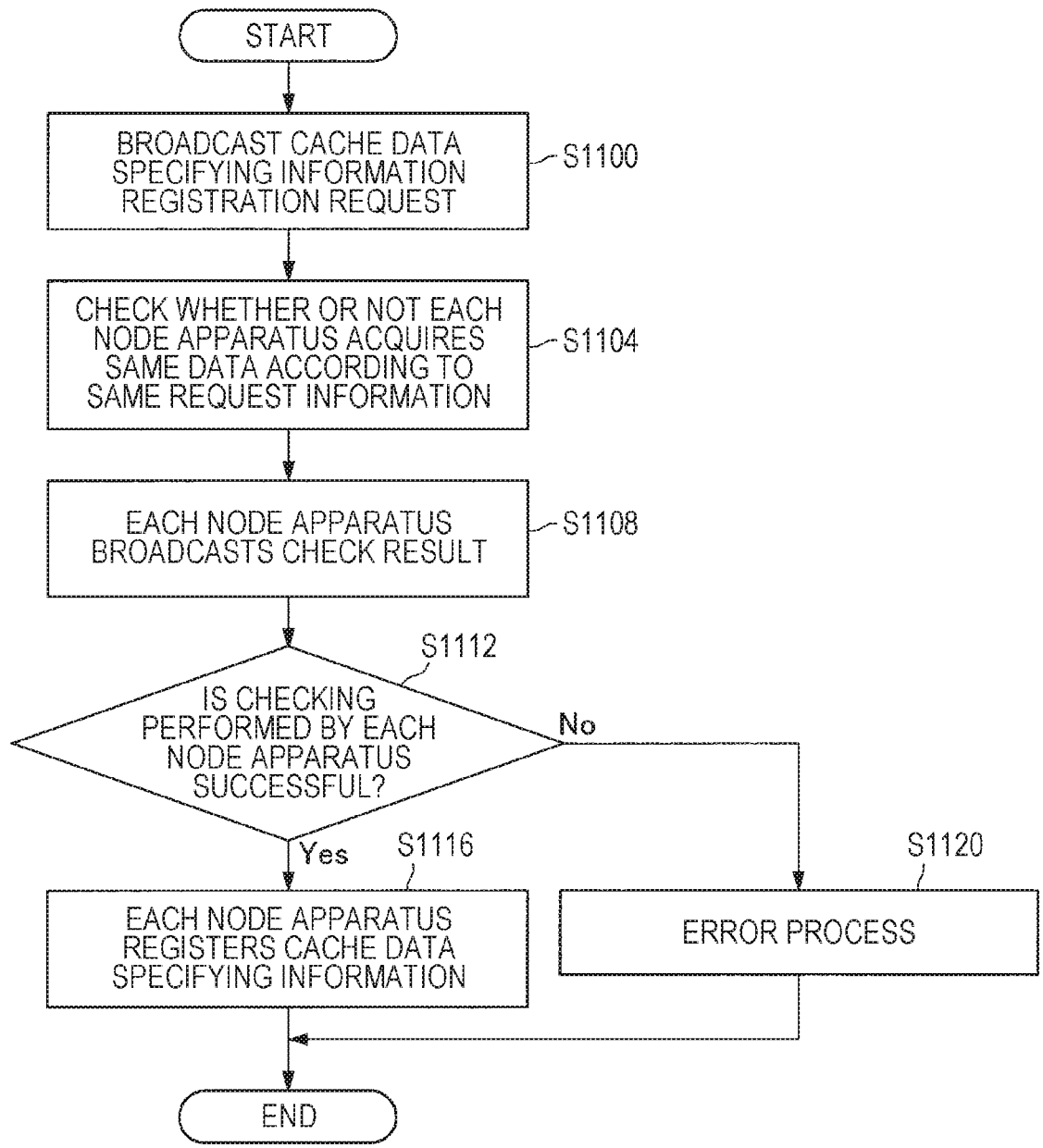
FIG. 8 is a flowchart illustrating an example of a process flow related to a consensus.

Subsequently, an example of the flow of the process related to a consensus will be described with reference to FIG. 8. More specifically, an example of the flow of the process related to a consensus that can be performed in the registration process of the cache data specifying information to the P2P database 221 in step S1032 of FIG. 7 will be described (Note that FIG. 8 illustrates also the registration process of the cache data specifying information to be performed after the process related to the consensus is performed).

In step S1100, the registration control unit 211 of the node apparatus 200 broadcasts a cache data specifying information registration request to the other node apparatuses 200. At this time, the registration control unit 211 also broadcasts information associated with the cached data (for example, data acquired from the P2P database 221 on the basis of request information and the request information or the like). Thereafter, in step S1104, the registration control unit 211 of each of the other node apparatuses 200 checks whether or not the same data is acquired from the P2P database 221 on the basis of the same request information. In step S1108, the registration control unit 211 broadcasts the check result to each node apparatus 200. In a case where checking performed by each node apparatus 200 is successful (step S1112/Yes), the registration control unit 211 of each node apparatus 200 registers the cache data specifying information to the P2P database 221 in step S1116, and the process ends. Note that as described above, the registration control unit 211 may register cache data specifying information to the P2P database 221 in a case where even if checking performed by all the node apparatuses 200 is not successful, a predetermined condition (for example, in a case where a specific node apparatus 200 has successfully performed the checking described above, more than a predetermined number of node apparatuses 200 has successfully performed the checking described above, or the like) is satisfied. In a case where checking performed by each node apparatus 200 is not successful (step S1112/No), a predetermined error process is performed in step S1120, and thus the process ends. For example, the registration control unit 211 of each node apparatus 200 performs a process of describing the error content in a log, or the like.

(Flow of Data Authenticity Checking Process)

Figure 9:
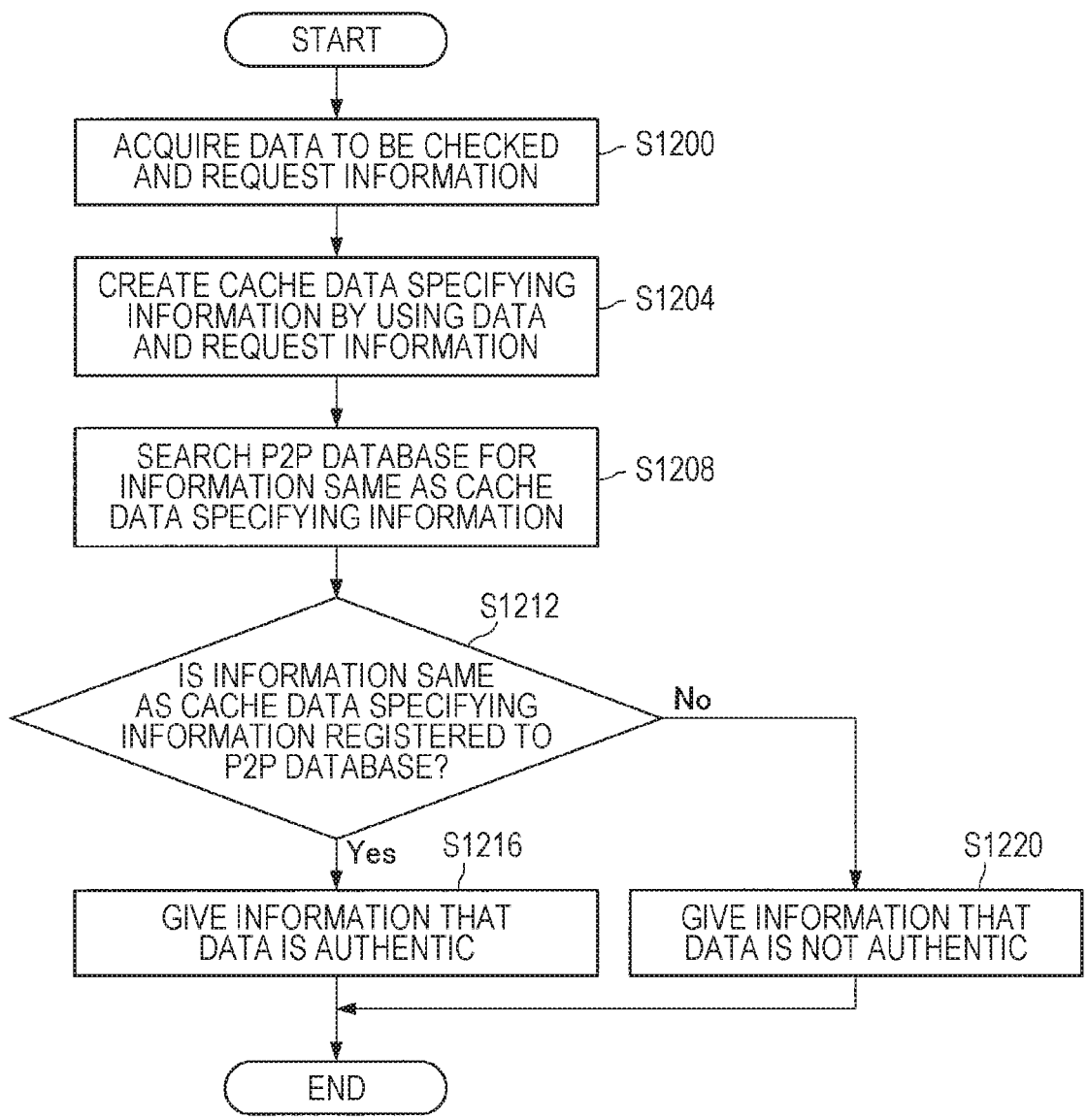
FIG. 9 is a flowchart illustrating an example of a flow of an authenticity checking process for data provided from a cache storage unit 121.

Subsequently, with reference to FIG. 9, an example of the flow of an authenticity checking process for data provided from the cache storage unit 121 will be described. For example, an example of the flow of the process in a case where the user requests the node apparatus 200 to check authenticity of data if the user receives the data from the cache storage unit 121 will be described. Note that as described above, the user may request the node apparatus 200 other than the node apparatus 200 that has acquired the data to check authenticity of the data.

In step S1200, the check unit 212 of the node apparatus 200 acquires data to be checked and request information. In step S1204, the check unit 212 creates cache data specifying information by using the data and the request information. In step S1208, the check unit 212 searches the P2P database 221 for the information same as the created cache data specifying information. In a case where the information same as the cache data specifying information is registered to the P2P database 221 (step S1212/Yes), in step S1216, the check unit 212 informs the user that the data to be checked is authentic. Then, the process ends. In a case where the information same as the cache data specifying information is not registered to the P2P database 221 (step S1212/No), in step S1220, the check unit 212 informs the user that the data to be checked is not authentic. Then, the process ends.

3. HARDWARE CONFIGURATION EXAMPLE

An embodiment of the present disclosure has been described above. Subsequently, a hardware configuration of each apparatus according to the present embodiment will be described with reference to FIG. 10.

Figure 10:
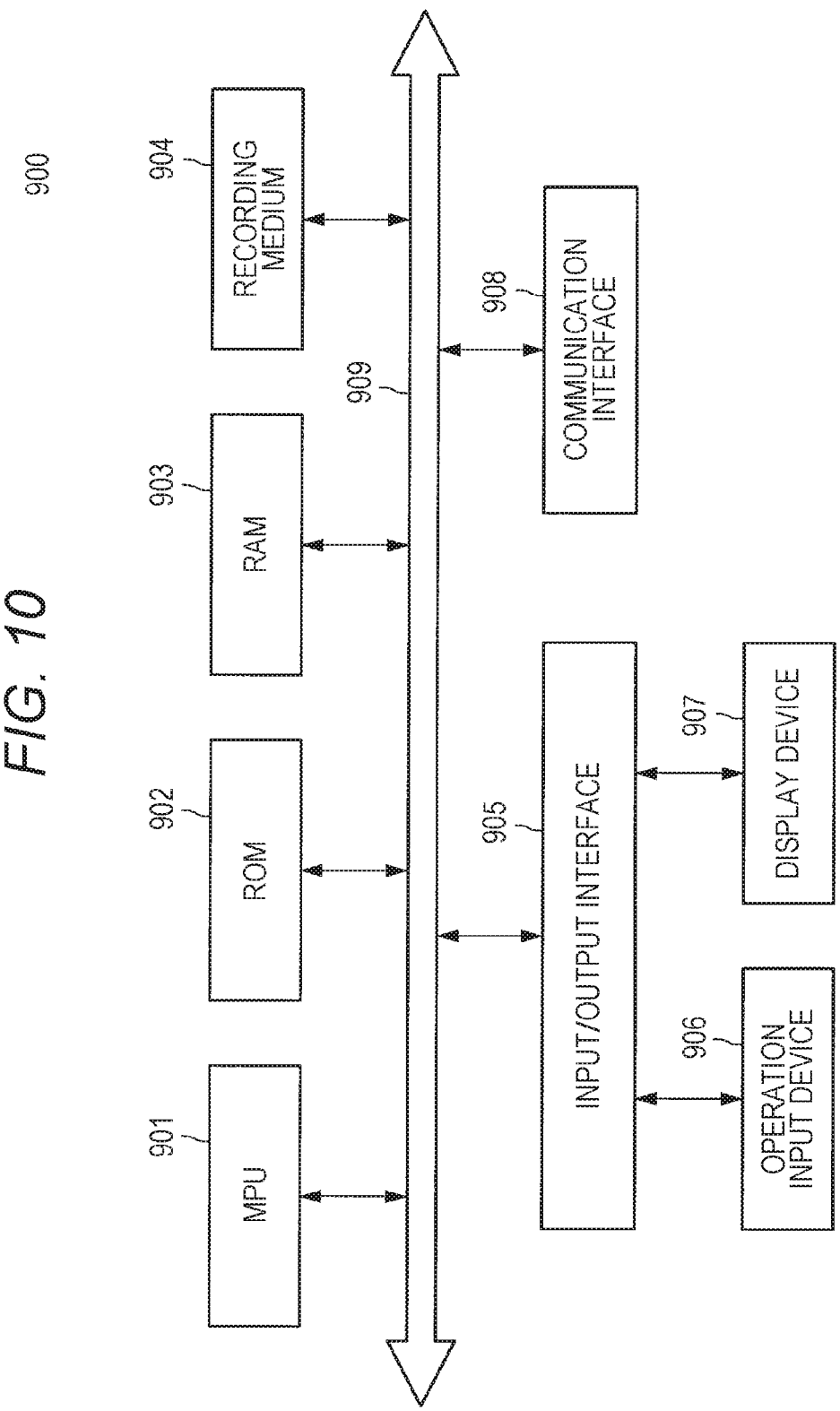
FIG. 10 is a block diagram illustrating a hardware configuration example of an information processing apparatus 900 that realizes the cache apparatus 100 or the node apparatus 200 according to the present embodiment.

FIG. 10 is a block diagram illustrating an example of the hardware configuration of the cache apparatus 100 or the node apparatus 200 according to the present embodiment. The cache apparatus 100 or the node apparatus 200 according to the present embodiment can be realized by the information processing apparatus 900 illustrated in FIG. 10.

The information processing apparatus 900 includes, for example, an MPU 901, a ROM 902, a RAM 903, a recording medium 904, an input/output interface 905, an operation input device 906, a display device 907, and a communication interface 908. Furthermore, the information processing apparatus 900 connects respective constituents, for example, with a bus 909 as a data transmission path.

The MPU 901 includes, for example, one or two or more processors including an arithmetic circuit such as an MPU, various processing circuits, and the like, and functions as the control unit 110 of the cache apparatus 100 or the control unit 210 of the node apparatus 200. Note that the control unit 110 of the cache apparatus 100 or the control unit 210 of the node apparatus 200 may include a dedicated (or general-purpose) circuit (for example, a processor or the like separate from the MPU 901) capable of realizing the various types of processes described above.

The ROM 902 stores control data such as a program, an arithmetic parameter, and the like that the MPU 901 uses. The RAM 903 temporarily stores, for example, a program executed by the MPU 901, and the like.

The recording medium 904 functions as the storage unit 120 of the cache apparatus 100 or the storage unit 220 of the node apparatus 200. For example, the recording medium 904 stores various data such as cached data, data or various programs regarding information processing according to the present embodiment such as the P2P database 221 or the P2P database program 222, or the like. Here, a magnetic recording medium such as a hard disk, a non-volatile memory such as a flash memory, or the like can be cited as an example of the recording medium 904. Furthermore, the recording medium 904 may be attachable to and detachable from the information processing apparatus 900.

The input/output interface 905 connects, for example, the operation input device 906 and the display device 907. Here, a universal serial bus (USB) terminal, a digital visual interface (DVI) terminal, a high-definition multimedia interface (HDMI) (registered trademark) terminal, various processing circuits, or the like can be cited as an example of the input/output interface 905.

Furthermore, for example, the operation input device 906 is provided on the information processing apparatus 900, and is connected to the input/output interface 905 inside the information processing apparatus 900. A keyboard, a mouse, a keypad, a touch panel, a microphone, an operation button, a rotary selector such as a direction key or a jog dial, or a combination thereof can be cited as an example of the operation input device 906.

Furthermore, for example, the display device 907 is provided on the information processing apparatus 900, and is connected to the input/output interface 905 inside the information processing apparatus 900. A liquid crystal display (liquid crystal display), an organic electro-luminescence display (organic EL display), or the like can be cited as an example of the display device 907.

Note that it goes without saying that the input/output interface 905 can be connected to an external device such as an operation input device or a display device outside the information processing apparatus 900. Furthermore, the display device 907 may be, for example, a device such as a touch panel, capable of performing display and being operated by a user.

The communication interface 908 is communication means included in the information processing apparatus 900, and functions as the communication unit 130 of the cache apparatus 100 or the communication unit 230 of the node apparatus 200. Furthermore, the communication interface 908 may have the function of performing wireless or wired communication with, for example, any external apparatus such as a server via any network (or directly). Here, a communication antenna and radio frequency (RF) circuit (wireless communication), an IEEE802.15.1 port and a transmission and reception circuit (wireless communication), an IEEE802.11 port and a transmission and reception circuit (wireless communication), a local area network (LAN) terminal and a transmission and reception circuit (wired communication), or the like can be cited as an example of the communication interface 908.

Note that the hardware configuration of the information processing apparatus 900 according to the present embodiment is not limited to the configuration illustrated in FIG. 10. For example, the information processing apparatus 900 may not include the communication interface 908 in the case of performing communication via a connected external communication device. In addition, the communication interface 908 may be configured to be able to perform communication by using a plurality of communication systems. Further, the information processing apparatus 900 may not include, for example, the operation input device 906, the display device 907, or the like. Furthermore, for example, some or all of the configurations illustrated in FIG. 10 may be realized by one or two or more integrated circuits (ICs).

4. SUMMARY

As described above, the cache apparatus 100 realizes a function of caching data acquired from the P2P database 221 on the basis of request information. As a result, the cache apparatus 100 can deal with more request information without increasing the load on the P2P database system.

Note that the cache apparatus 100 can also determine whether or not to cache data according to a predetermined determination logic, instead of caching all the pieces of data acquired from the P2P database 221. As a result, since the cache apparatus 100 can cache only appropriate data, it is possible to prevent an erroneous answer and to reduce the amount of data to be cached.

Furthermore, the node apparatus 200 registers cache data specifying information that can uniquely specify cached data to the P2P database 221. As a result, the node apparatus 200 can check authenticity of the data. In other words, because of the above mechanism, the node apparatus 200 can prevent a decrease in reliability due to provision of cached data.

Note that the node apparatus 200 can reach a consensus with the respective node apparatuses 200 before registering cache data specifying information to the P2P database 221. As a result, the node apparatus 200 can ensure authenticity of data more reliably.

Furthermore, the cache apparatus 100 understands the content of new request information by analyzing the new request information. In a case where the new request information can be reconstructed from the past request information, the cache apparatus 100 can deal with the new request information by reconstructing cached data.

While the preferred embodiments of the present disclosure have been described in detail with reference to the accompanying drawings, the technical scope of the present disclosure is not limited to such examples. It is obvious that a person skilled in the art to which the present disclosure pertains can conceive various modifications and corrections within the scope of the technical idea described in the claims, and it is naturally understood that these also belong to the technical scope of the present disclosure.

For example, the respective steps in the flowcharts or the sequence diagrams described above do not necessarily have to be processed in time series in the order described in the flowcharts or the sequence diagrams. That is, the respective steps in the flowcharts or the sequence diagrams may be processed in an order different from the order described in the flowcharts or the sequence diagrams, or may be processed in parallel.

Furthermore, the effects described in the present Description are illustrative or exemplary only and are not limited. That is, the technique according to the present disclosure can exhibit other effects that are apparent to those skilled in the art from the description of the present Description in addition to or in lieu of the effects described above.

Note that the following configurations also belong to the technical scope of the present disclosure.

(1)

An information processing apparatus including an acquisition unit that acquires data provided from a P2P database on the basis of request information, and a storage control unit that controls storage of the data performed by a cache storage unit.

(2)

The information processing apparatus according to the (1) further including an answer unit that provides the data as an answer to the request information.

(3)

The information processing apparatus according to the (2), in which the answer unit provides the data from any one of the P2P database or the cache storage unit on the basis of the request information.

(4)

The information processing apparatus according to the (3), in which the answer unit provides the data from the cache storage unit in a case where the request information is same as past request information.

(5)

The information processing apparatus according to the (3), in which the answer unit provides data obtained by reconstructing data stored in the cache storage unit, in a case where the request information is able to be reconstructed from past request information.

(6)

The information processing apparatus according to the (3), in which in a case where the request information includes identification information of data stored in the cache storage unit, the answer unit provides the data identified by the identification information from the cache storage unit.

(7)

The information processing apparatus according to any one of the (1) to (6), in which on the basis of content requested according to the request information, frequency requested according to the request information, or time required to acquire the data requested according to the request information, the storage control unit controls storage of the data performed by the cache storage unit.

(8)

The information processing apparatus according the (7), in which in a case where the content requested according to the request information is same as content requested according to past request information, the storage control unit causes the cache storage unit to store the data, in a case where the frequency requested according to the request information is higher than a predetermined value, or in a case where the time required to acquire the data requested according to the request information is longer than a predetermined value.

(9)

The information processing apparatus according to any one of the (1) to (8) further including a registration control unit that controls registration of information to the P2P database, the information uniquely identifying the data stored in the cache storage unit.

(10)

The information processing apparatus according to the (9), in which the information uniquely identifying the data is a hash value of the data.

(11)

The information processing apparatus according to the (9) or (10), in which in a case where the registration control unit confirms that a plurality of apparatuses which each owns the P2P database acquires the data from the P2P database on the basis of the request information, the registration control unit performs control so as to register the information uniquely identifying the data to the P2P database.

(12)

The information processing apparatus according to any one of the (9) to (11), in which the information uniquely identifying the data is used to check authenticity of the data.

(13)

The information processing apparatus according to the (12), in which the authenticity is checked by an apparatus other than an apparatus that has acquired the data from the P2P database.

(14)

The information processing apparatus according to any one of the (1) to (13), in which the P2P database is blockchain data.

(15)

An information processing method executed by a computer, the method including acquiring data provided from a P2P database on the basis of request information, and controlling storage of the data performed by a cache storage unit.

(16)

A program causing a computer to acquire data provided from a P2P database on the basis of request information, and to control storage of the data performed by a cache storage unit.

REFERENCE SIGNS LIST

100 Cache apparatus
110 Control unit
111 Answer unit
112 Storage control unit
113 Registration control unit
120 Storage unit
121 Cache storage unit
130 Communication unit
200 Node apparatus
210 Control unit
211 Registration control unit
212 Check unit
220 Storage unit
221 P2P database
222 P2P database program
230 Communication unit
300 User apparatus
400 P2P network
500 Network

The invention claimed is:

1. A first information processing apparatus, comprising:
a cache storage unit; and
circuitry configured to:
acquire a plurality of data items from a peer-to-peer (P2P) database based on a plurality of request information items;
determine a specific data item of the plurality of data items is to be stored in the cache storage unit,
wherein the determination of the specific data item is to be stored in the cache storage unit is based on a time required to acquire the specific data item from the P2P database;
control, based on the determination of the specific data item is to be stored in the cache storage unit, the cache storage unit to store the specific data item;
acquire request information from a user apparatus;
reconstruct first information from a set of request information items of the plurality of request information items based on the acquired request information;
reconstruct data from a set of data items of the plurality of data items based on the reconstructed first information, wherein
the reconstructed first information and the acquired request information are different from the plurality of request information items,
each of the set of request information items is different,
each of the set of data items is different, and
the set of data items is associated with the set of request information items;
provide the reconstructed data to the user apparatus; and
control registration of second information to the P2P database, wherein the second information indicates identification of the specific data item of the plurality of data items.

2. The first information processing apparatus according to claim 1, wherein the second information is a hash value of the specific data item.

3. The first information processing apparatus according to claim 1, wherein
a plurality of apparatuses is associated with the P2P database,
each of the plurality of apparatuses confirms that the specific data item is acquired from the P2P database,
the specific data item is acquired based on a specific request information item of the plurality of request information items, and
the circuitry is further configured to register the second information to the P2P database based on the confirmation.

4. The first information processing apparatus according to claim 1, wherein authenticity of the specific data item is associated with the second information.

5. The first information processing apparatus according to claim 4, wherein the authenticity of the specific data item is checked by a second information processing apparatus different from the first information processing apparatus.

6. The first information processing apparatus according to claim 1, wherein the P2P database is blockchain data.

7. An information processing method, comprising:
in an information processing apparatus that includes a cache storage unit:
acquiring a plurality of data items from a peer-to-peer (P2P) database based on a plurality of request information items;
determining a specific data item of the plurality of data items is to be stored in the cache storage unit,
wherein the determination of the specific data item is to be stored in the cache storage unit is based on a time required to acquire the specific data item from the P2P database;
controlling, based on the determination of the specific data item is to be stored in the cache storage unit, the cache storage unit to store the specific data item;
acquiring request information from a user apparatus;

reconstructing first information from a set of request information items of the plurality of request information items based on the acquired request information;

reconstructing data from a set of data items of the plurality of data items based on the reconstructed first information, wherein the reconstructed first information and the acquired request information are different from the plurality of request information items, each of the set of request information items is different, each of the set of data items is different, and the set of data items is associated with the set of request information items;

providing the reconstructed data to the user apparatus; and controlling registration of second information to the P2P database, wherein the second information indicates identification of the specific data item of the plurality of data items.

8. A non-transitory computer-readable medium having stored thereon computer-executable instructions which, when executed by a processor, cause the processor to execute operations, the operations comprising:

acquiring a plurality of data items from a peer-to-peer (P2P) database based on a plurality of request information items;

determining a specific data item of the plurality of data items is to be stored in a cache storage unit, wherein the determination of the specific data item is to be stored in the cache storage unit is based on a time required to acquire the specific data item from the P2P database;

controlling, based on the determination of the specific data item is to be stored in the cache storage unit, the cache storage unit to store the specific data item;

acquiring request information from a user apparatus;

reconstructing first information from a set of request information items of the plurality of request information items based on the acquired request information;

reconstructing data from a set of data items of the plurality of data items based on the reconstructed first information, wherein the reconstructed first information and the acquired request information are different from the plurality of request information items, each of the set of request information items is different, each of the set of data items is different, and the set of data items is associated with the set of request information items;

providing the reconstructed data to the user apparatus; and controlling registration of second information to the P2P database, wherein the second information indicates identification of the specific data item of the plurality of data items.

\* \* \* \* \*